UNITED STATES PATENT OFFICE.

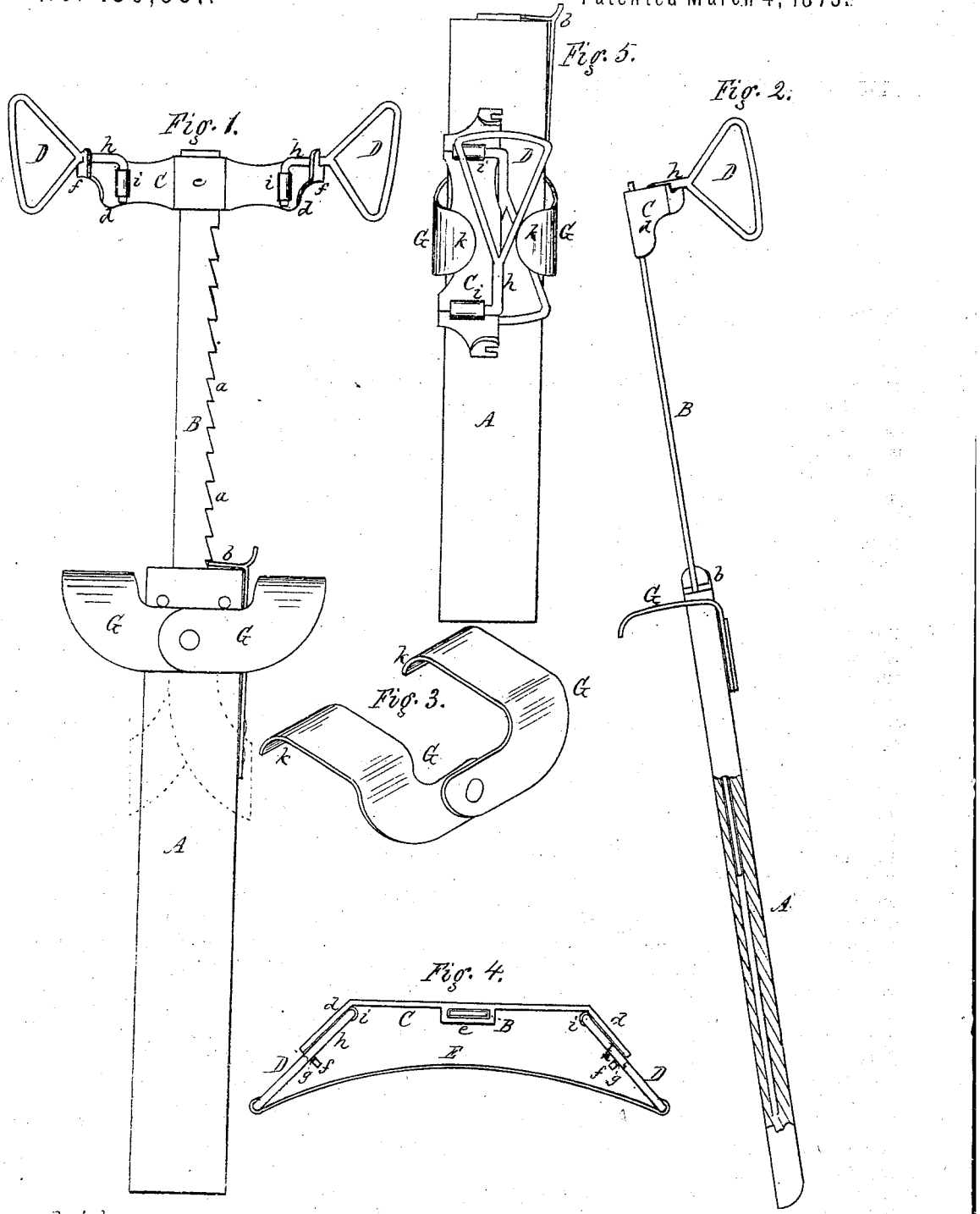

OTIS M. MITCHELL, OF MARATHON, ASSIGNOR TO ABRAHAM NELLIS, OF FORT PLAIN, NEW YORK.

IMPROVEMENT IN HEAD-RESTS.

Specification forming part of Letters Patent No. 136,531, dated March 4, 1873.

*To all whom it may concern:*

Be it known that I, OTIS M. MITCHELL, of Marathon, in the county of Cortland and State of New York, have invented a certain new and useful Improvement in Head-Rests for Car-Seats, Chairs, &c., of which the following is a specification:

My invention consists of a portable head-rest, so constructed as to be easily applied to the back of a car seat, chair, or other seat, easily and expeditiously removed and folded, and packed in a satchel or traveling-bag, so as to occupy but little space.

In the drawing, Figure 1 is a front elevation; Fig. 2, a side elevation; Fig. 3, a perspective view of the hooks or clamp for attaching the device to the back of the seat; Fig. 4, a plan of the head-rest proper; Fig. 5, a view of the device as packed for transportation.

A is the shank or base of the device, and B is a ratchet-bar which slides up and down within it. The edge of the bar is cut with a series of ratchet-teeth, $a\,a$, with which engages a spring-pawl, $b$, by which the bar is held at any elevation. C is the cross-head located at the top of the ratchet-bar. It has a socket, $c$, which slides closely over the end of the bar so that it may be applied or removed at pleasure. The ends $d\,d$ of the cross-head are bent out at an obtuse angle, as shown in Fig. 4, and the extremities $f\,f$ of these ends are bent at right angles, or nearly so, to their lengths. These extremities have open-topped notches $g\,g$, in which rest the shanks $h\,h$ of the loops D D, the ends of these shanks being bent down at right angles, and resting in sockets or eyes $i\,i$ of the cross-head. By this means it will be seen that the loops can be attached to the ends of the cross-head so as to become fixtures to the same, and at the same time can be removed by simply lifting off. The upper ends of the loops preferably incline outward, as shown in Fig. 1, and the upper ends are also preferably set or bent a little back from the plane of the lower ends. This is for the purpose of adapting the device to the shape of the person's head which rests thereon. To each loop is attached the end of a strap, E, Fig. 4, which is simply sewed or otherwise fastened. The strap is preferably somewhat loose, as indicated, so as to form a concave bearing for the head; and since the loops form fixtures to the cross-head, as before described, and cannot be drawn together when resting in their notches, the whole is firm and substantial. Near the top of the shank or base A are pivoted two hooks or clamps, G G. These hooks are substantially of the form shown in Fig. 3, passing out in a plane beyond the sides of the shank, then turning upward and backward, and ending in the bend $k$, which hooks over the back of the car or other seat; or, if attached to a common chair, it may be secured by a set-screw, clamp, or other device. This sustains the weight of the instrument; and as the shank extends down inside the seat, behind the back of the person in sitting, the whole is held steadily.

The above describes the position of the parts when in use. When not in use, the hooks or clamps are turned down, as shown in dotted lines, Fig. 1, and in the reverse view as shown in Fig. 5. In this case, also, the cross-head is drawn from off the end of the ratchet-bar; the latter is forced down into the body of the shank or base; the loops are raised so as to disengage them from the notches in the extremities $f\,f$, and swing inward, one on one side and the other on the other; and the cross-head, with its attachments, is then inserted loosely in the space inclosed by the bends $k\,k$ of the hooks, which turn in to embrace them, as clearly indicated in Fig. 5. The whole is then in the most compact and simple form for storage in a satchel or traveling-bag, and can be easily transported.

This device will be of great service to night travelers on railroads, as it can be easily attached to the back of a car-seat, and furnishes a convenient and easy rest for the head. It will obviate the great difficulty which now exists in supporting the head above the seat. There are many persons who dislike the use of sleeping-cars. This device renders an ordinary car-seat nearly as comfortable as a berth in a sleeping-car, as the person can rest the whole body and head against the support. It will also be of great service to invalids and others, for use on ordinary chairs. As it is not screwed or otherwise permanently connected with the car-seat, but simply hooks on, there can be no objection to its use. By means of the ratchet and pawl, it can be extended to any height; and if desired the ratchet-bar may be slightly curved backward, to give ease to the position and fit the head properly. Its cheapness, compactness, portability, and ease of application will recommend it to the community.

I am aware that fixed head-rests of various forms, applied to seats, have before been known; I claim only the device as above described.

What I claim, and desire to secure by Letters Patent, is—

A portable head-rest for car-seats, chairs, &c., consisting of the base A, ratchet-bar B, cross-head C, loops D, strap E, and hooks or clamps G, when arranged, combined, and operating as herein described.

In witness whereof I have hereunto signed my name in the presence of two subscribing witnesses.

O. M. MITCHELL.

Witnesses:
  R. F. OSGOOD,
  ARCHIE BAINE.